United States Patent [19]
Ellis et al.

[11] Patent Number: 5,215,032
[45] Date of Patent: Jun. 1, 1993

[54] SYSTEM, APPARATUS AND METHOD FOR RAPIDLY ATTACHING A BOAT COVER OR CANOPY TO A WINDSHIELD

[75] Inventors: Jeffrey W. Ellis, Cocoa; John W. Hamilton, Mims, both of Fla.

[73] Assignee: Ray Industries, Inc., Knoxville, Tenn.

[21] Appl. No.: 794,148

[22] Filed: Nov. 19, 1991

[51] Int. Cl.⁵ ............................................. B63B 17/00
[52] U.S. Cl. ....................................................... 114/361
[58] Field of Search ................ 114/343, 361; 403/165, 403/187, 263, 267, 315, 357, 347; 135/87, 88

[56] References Cited

U.S. PATENT DOCUMENTS

| | | | |
|---|---|---|---|
| 2,937,652 | 5/1960 | Zimmer et al. | 114/361 |
| 2,961,725 | 11/1960 | McGee | 114/361 |
| 3,021,535 | 2/1962 | Dorst | 114/361 |
| 3,093,845 | 6/1963 | Brock et al. | 114/361 |
| 3,172,419 | 3/1965 | Lewis | 114/361 |
| 3,930,738 | 1/1976 | Thuss et al. | 403/294 |
| 4,750,449 | 6/1988 | Muhlberger | 114/361 |
| 4,993,351 | 2/1991 | Zirkelbach et al. | 114/361 |

Primary Examiner—Jesus D. Sotelo
Assistant Examiner—Stephen Avila
Attorney, Agent, or Firm—Allen, Dyer, Doppelt, Franjola & Milbrath

[57] ABSTRACT

A flexible member is attached continuously to an inside surface of a boat canopy along its peripheral edge, and has a portion extending lateral to the plane of the canopy with a second portion attached to the first portion and extending lateral to that first portion. A gripping member is fixed to the upper extremity of a boat windshield and has a continuous, outwardly-facing slot extending generally parallel with the upper extremity of the windshield and dimensioned to receive the first portion of the flexible member into an internal recess also portion of the flexible member into an internal recess also dimensioned to receive the second portion. The canopy is attached to the windshield by continuously pushing the second portion of the flexible member through the slot and into the internal recess.

15 Claims, 2 Drawing Sheets

SYSTEM, APPARATUS AND METHOD FOR RAPIDLY ATTACHING A BOAT COVER OR CANOPY TO A WINDSHIELD

BACKGROUND OF THE INVENTION

1. Field of the Invention

The present invention relates to apparatus and methods for attaching a canopy, cover or other form of top to a fixed structure, such as a boat windshield.

2. Description of the Prior Art

A variety of techniques have been described in the prior art for attaching a canopy or similar cover to a fixed structure, such as a boat windshield. Typically, metal fastening systems are utilized along the edge of the fixed structure, with mating fasteners on the cover. Examples of such arrangements are shown in the following U.S. Pat. Nos.: 3,172,419 to Lewis; 4,750,449 to Muhlberger; 2,961,725 to McGhie; 2,937,652 to Zimmer et. al.; 3,416,282 to Daugherty; 3,093,845 to Brock et. al.; and 4,993,351 to Zirkelbach et. al.. Canadian Patent 685,026 is also of interest.

So called "zipper" or continuous fasteners are also well known in the prior art. Such arrangements employ a flexible bead or similar structure which is pressed continuously into a slot or channel for locking, and then is removed by pulling the bead away from the slot. However, such arrangements have not been generally used in the past for large structures, because of the requirements for strength, rigidity and resistance to wind loading.

SUMMARY OF THE INVENTION

The present invention is a system, apparatus and method for rapidly attaching a canopy or similar cover to a fixed structure, such as a boat windshield, in an arrangement utilizing a flexible locking member which permits rapid attachment to a boat windshield or similar fixed structure, but which also provides sufficient strength and rigidity to achieve desired resistance to wind loading and other adverse environmental conditions.

The present invention contemplates the use of a gripping member and a flexible member which are designed to mate together in a locking arrangement. The flexible member is attached continuously to the inside surface of the canopy or cover along its peripheral edge, the flexible member having a first portion extending lateral to the plane of the canopy and a second portion attached to the first portion and extending lateral to the first portion. The gripping member is fixed to the upper extremity of the fixed structure, for example a boat windshield, and has a continuous, outwardly-facing slot extending generally parallel with the upper extremity of the boat windshield and is dimensioned to receive the first portion of the flexible member, and further includes an internal rest recess dimensioned to receive the second portion of the flexible member.

In the preferred embodiment of this invention, the second portion of the flexible member comprises a forward segment extending from the first portion toward the periphery of the canopy, and a rearward segment extending from the first portion and away from the periphery, the rearward segment having a tapered surface which mates with a corresponding tapered surface of the internal recess of the gripping member. The forward segment is substantially thinner in cross sectional dimension than the rearward segment, thereby imparting greater flexibility to that forward segment. The slot of the gripping member is defined by a tab which engages the extremity of the forward segment of the first portion of the flexible member, in a manner which permits rapid unlocking of the entire flexible member from the internal recess of the gripping member. The flexible member is dimensioned and configured for rapid insertion into the internal recess, by first drawing the boat canopy downwardly over the gripping member, and then extending the rearward segment of the flexible member through the slot and into the internal recess of the gripping member, and then pushing the forward segment and the first, lateral portion of the flexible member through the slot and into the internal recess. Thereafter, the flexible member may be unlocked from the gripping member by rotating the peripheral edge of the canopy away from the gripping member, thereby unlocking the forward segment of the second portion of the gripping member from the tab defining the slot of the gripping member. The forward segment of the first portion of the flexible member, and the slot and internal recess of the gripping member are so designed as to permit a rolling disengagement of the flexible member in a manner which avoids inadvertent unlocking, until a positive force is exerted in a lateral direction along the peripheral edge of the boat canopy, thus avoiding inadvertent unlocking in high wind loading conditions.

Other features of the present invention will be appreciated by those skilled in the art upon a review of the drawings and detailed description, set forth below.

THE DRAWINGS

DETAILED DESCRIPTION OF THE PREFERRED EMBODIMENT

A preferred embodiment of the present invention will now be described with reference to the drawings.

Figure 1:
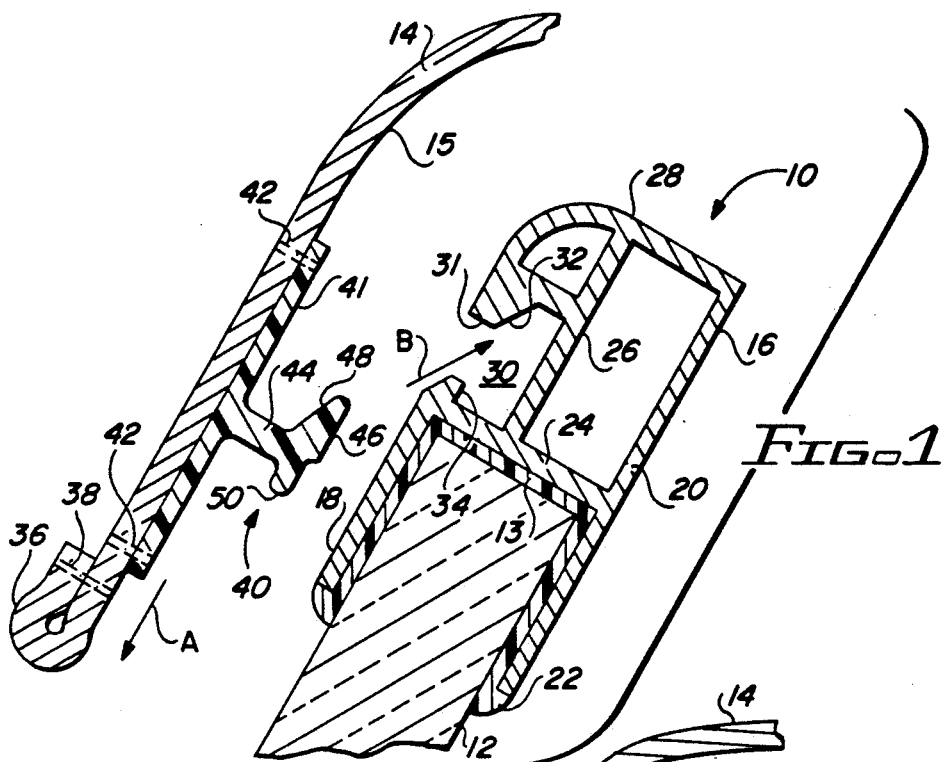
FIG. 1 is a cross section of a boat canopy and windshield embodiment employing the gripping and locking system of the present invention, particularly illustrating the manner in which the locking operation is first initiated.

Reference is first made to FIG. 1 where a boat windshield and canopy assembly, referred to generally by the reference numeral 10, is shown for purposes of illustrating the system of the present invention for rapidly attaching a canopy or cover continuously to a fixed structure. In Figure 1, the assembly 10 includes a boat windshield 12 having an upper extremity 13, and a boat canopy 14 having an inside surface 15. In accordance with the present invention, there is provided a gripping member 16 formed of an extrusion of a suitable material, for example aluminum, having a pair of arms 18, 20 and an internal plate 24 adapted to fit across the upper extremity 13 of the boat windshield 12, and along its sides, as shown. Suitably, a gasket material 22 is inserted between the gripping member 16 and the boat windshield 12. The extrusion 16 includes an internal plate 26 extending from plate 24 to curved plate 28 defining the upper extremity of the gripping member 16. The radius of the upper plate 28 is not critical, but is intended to provide a rounded surface for the boat canopy 14, and its associated flexible member which is described in greater detail below.

With continued reference to FIG. 1, the gripping member 16 includes an internal recess 30 communicating with a slot 31, which slot extends generally parallel with the boat windshield. The slot 31 is defined by the extremities of the arm 18 and the upward radial plate 28. The internal recess 30 is defined by a tapered surface 32.

The flexible member is defined by a flat plate 40, a first portion, or riser 44 extending laterally from the plate 40 and first and second locking segments 46 and 50 which extend, respectively, in forward and rearward directions with respect to the peripheral edge 36 of the canopy 14. The plate 40, the riser 44 and the first and second locking segments 46, 50 comprise an integrally molded flexible member which is attached to the inside surface 15 of the canopy 14 by threads 42, adjacent the rolled periphery 36 of the canopy 14.

As is shown in FIG. 1, the second locking segment 46 has an inside tapered surface 48 generally conforming to the taper of the surface 32 along the internal recess 30 of the gripping member 16.

As is further shown in FIG. 1, the forward locking segment 50 is substantially thinner in cross sectional dimension than the rearward locking segment 46, to thereby impart greater flexibility to that forward locking segment.

Figure 5:
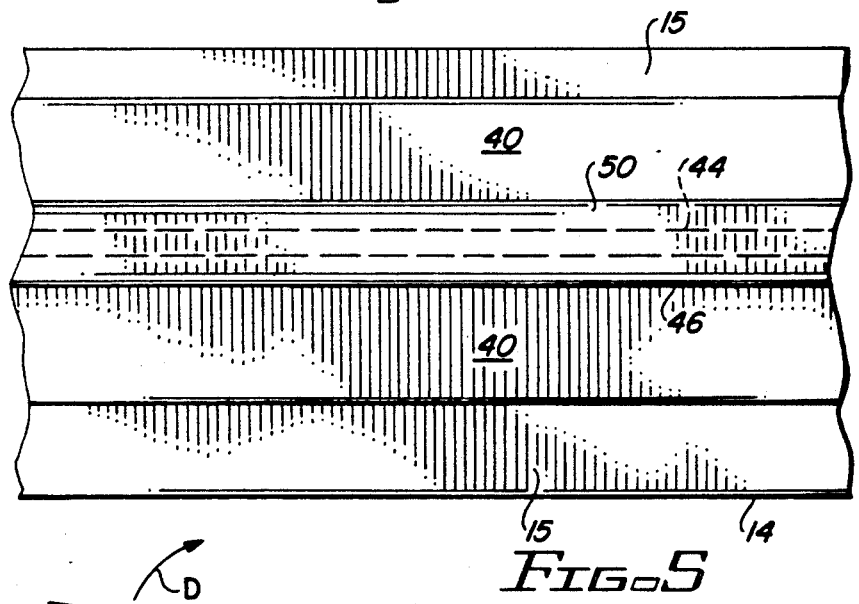
FIG. 5 is a top plan view of the flexible member attached to the inside surface of a boat canopy.

The configuration of the flexible member, including its plate 40, the first, riser portion 44 and the rearward and forward locking tabs 46, 50, respectively, when reference is made to the plan view of FIG. 5.

Referring again to FIG. 1, the flexible member 40 is locked into the gripping member 16 by first drawing the peripheral edge 36 of the boat canopy 14 downwardly and generally parallel to the boat windshield 12 as is shown by the arrow A in FIG. 1. Thereafter, the rearward locking segment 46 of the flexible member 40 is pushed through the slot 31 and across the tapered surface 32 of the internal recess 30 as is shown by the arrow B in FIG. 1. After these two steps are accomplished, a portion of the flexible member is within the internal recess 30 of the gripping member 16, as is illustrated in FIG. 2.

Figure 2:
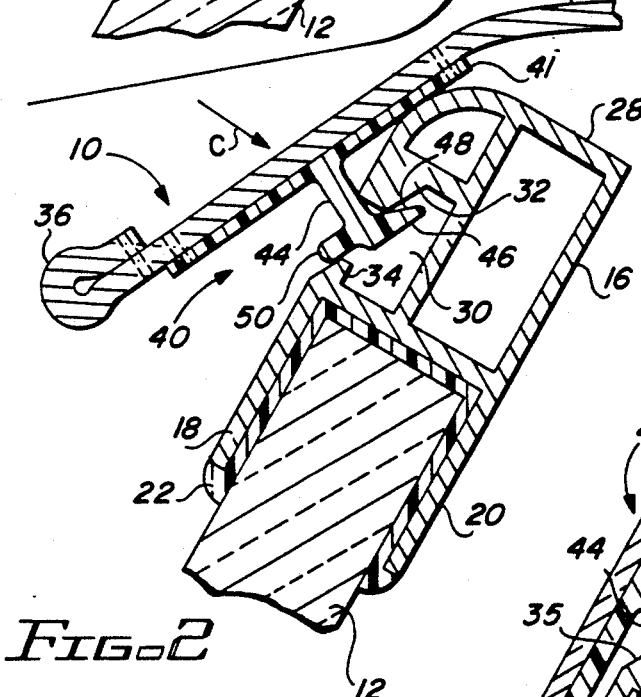
FIG. 2 is a cross section like that of Figure showing an intermediate step in the locking operation.
Figure 3:
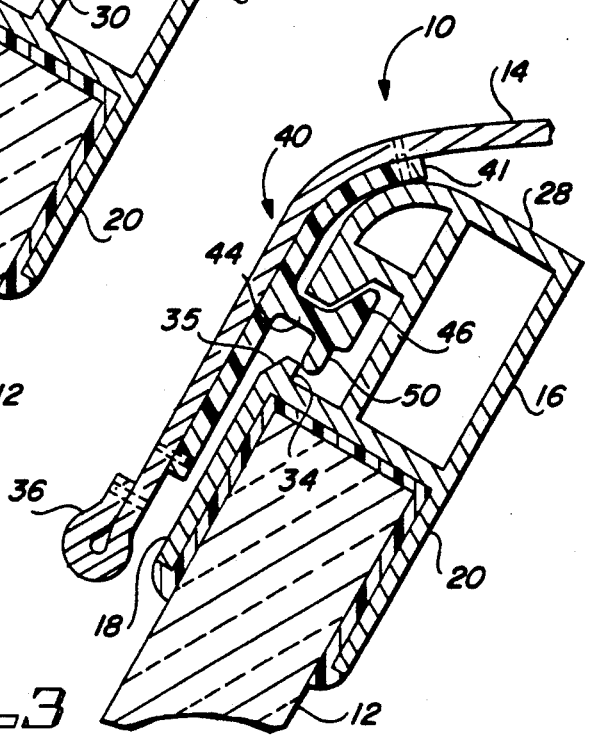
FIG. 3 is a cross section like that of FIGS. 1 and 2, illustrating the apparatus of the present invention in a locking configuration.

The locking procedure is completed in the manner shown in FIG. 2, by pushing the flexible member 40 downwardly as shown by arrow C in FIG. 2, to drive the flexible, forward locking segment 50 across the tab 34 and into the internal recess 30. The resulting configuration is shown in FIG. 3, the details of which are described next. As is shown in FIG. 3, the inside tapered surface 48 of the rearward locking segment 46 lies across the corresponding tapered surface 32 of the gripping member 16 (reference numerals 48 and 32 are omitted in FIG. 3, for clarity, but are set out in FIG. 1). As will be appreciated by those skilled in the art, the canopy 14 has a significant stretch, thereby keeping the riser portion 44 of the flexible member 40 against the rear edge of the slot 31 as defined by the plate 28. In this configuration, the forward locking segment 50 is maintained in a relationship with tab 34 to just be engaged with that tab, and is not held substantially underneath that tab, as is shown in FIG. 3. Such locking as between the tab 34 and the locking segment 50 is unnecessary, because of the tension of the canopy 14, and the configured locking arrangement between the tapered surfaces of the rearward locking segment 46 and the gripping member 16.

Figure 4:
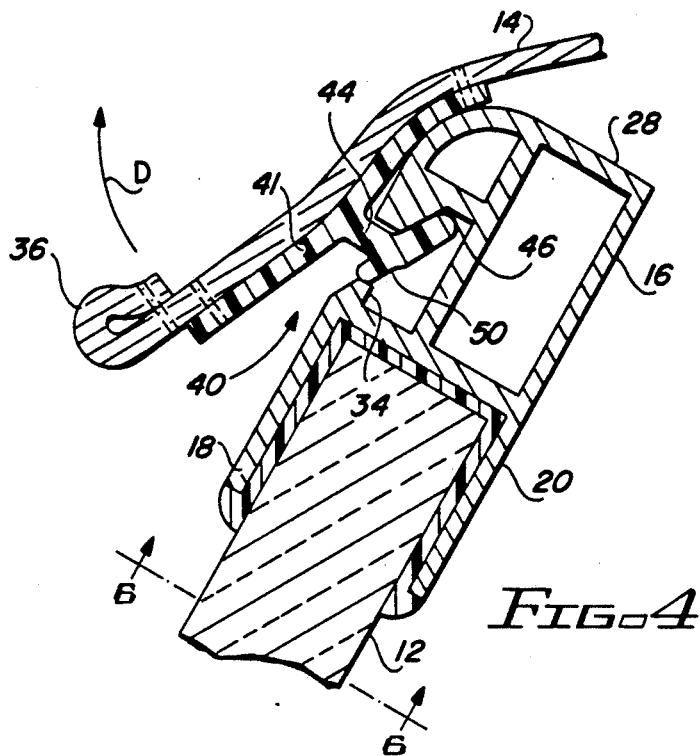
FIG. 4 is a cross section like that of FIGS. 1-3, and illustrating a step in the unlocking of the flexible member associated with the boat canopy from the gripping member on the boat windshield.

Reference is now made to FIG. 4. When it is desired to unlock the flexible member 40 from the gripping member 16, the peripheral edge 36 of the canopy 14 is pulled upwardly in a direction away from the arm 18, as is shown by arrow D. As this is undertaken, the forward locking segment 50 easily moves across the extremity of the tab 34.

Figure 6:
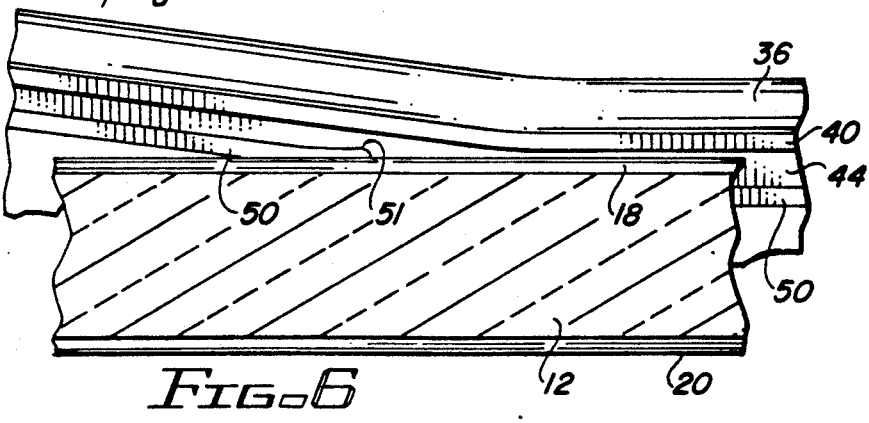
FIG. 6 is an end view of the apparatus of the present invention as shown in FIG. 4, during the unlocking operation, and in which the various elements are partially cut away.

Reference is now made to FIG. 6. As is shown, the forward locking segment 50 develops a rolled portion 51 as it unlocks from the tab 34. Again, this is achieved because the forward locking segment is both substantially flexible in relation to the rearward locking segment 46, and because the forward locking segment does not extend substantially underneath the tab 34 of the gripping member 16.

The system, apparatus and method of the present invention thus provides a mechanism for rapidly attaching a canopy or cover to a fixed structure, and which is suitable for use in adverse environmental circumstances.

This concludes the description of the preferred embodiments. A reading by those skilled in the art will bring to mind various changes without departing from the spirit and scope of the invention. It is intended, however, that the invention only be limited by the following appended claims.

What is claimed is:

1. A system for rapidly attaching a peripheral edge of a boat canopy continuously to an upper extremity of an associated windshield, comprising:

a flexible member attached continuously to an inside surface of the canopy along the peripheral edge, the flexible member having a first portion extending lateral to the plane of the boat canopy and a second portion attached to the first portion and extending generally lateral to the first portion;

a gripping member fixed to the upper extremity of the windshield, the member having a continuous, upwardly and outwardly-facing slot extending generally parallel with the upper extremity of the boat windshield and dimensioned to receive the first portion of the flexible member, and the gripping member further including an internal recess dimensioned to receive the second portion of the flexible member; and wherein the boat canopy is attached to the windshield by continuously pushing the second portion of the flexible member through the slot and into the internal recess of the gripping member.

2. The system recited in claim wherein the second portion of the flexible member comprises a forward segment extending from the first portion toward the periphery of the canopy and a rearward segment extending from the first portion and away from the periphery of the canopy, and wherein the internal recess is defined by a first surface on one side of the slot for engaging the forward segment and a second surface on the other side of the slot for engaging the rearward segment.

3. The system recited in claim 1 wherein the flexible member further comprises a plate with the first portion attached thereto, and means for fastening the plate to the inside surface of the boat canopy.

4. The system recited in claim 3 wherein the plate and the first and second portions are integrally formed of a flexible material.

5. The system recited in claim 4 wherein the flexible plate is sewn to the inside surface at the periphery of the boat canopy.

6. A system for rapidly attaching a peripheral edge of a boat canopy continuously to an upper extremity of an associated windshield, comprising:

a flexible member attached continuously to an inside surface of the canopy along the peripheral edge, the flexible member having a first portion extending lateral to the plane of the boat canopy and a second portion attached to the first portion and extending generally lateral to the first portion, wherein the second portion of the flexible member comprises a forward segment extending from the first portion toward the periphery of the canopy and a rearward segment extending from the first portion and away from the periphery of the canopy, and wherein the internal recess is defined by a first surface on one side of the slot for engaging the forward segment and a second surface on the other side of the slot for engaging the rearward segment, and wherein the rearward segment of the second portion of the flexible member is tapered in the direction from the first portion, and wherein the second surface of the internal recess of the gripping member has a taper generally corresponding to the taper of the rearward segment;

a gripping member fixed to the upper extremity of the windshield, the member having a continuous, outwardly-facing slot extending generally parallel with the upper extremity of the boat windshield and dimensioned to receive the first portion of the flexible member, and the gripping member further including an internal recess dimensioned to receive the second portion of the flexible member; and wherein the boat canopy is attached to the windshield by continuously pushing the second portion of the flexible member through the slot and into the internal recess of the gripping member.

7. A system for rapidly attaching a peripheral edge of a boat canopy continuously to an upper extremity of an associated windshield, comprising:

a flexible member attached continuously to an inside surface of the canopy along the peripheral edge, the flexible member having a first portion extending lateral to the plane of the boat canopy and a second portion attached to the first portion and extending generally lateral to the first portion, wherein the second portion of the flexible member comprises a forward segment extending from the first portion toward the periphery of the canopy and a rearward segment extending from the first portion and away from the periphery of the canopy, and wherein the internal recess is defined by a first surface on one side of the slot for engaging the forward segment and a second surface on the other side of the slot for engaging the rearward segment, and wherein the forward segment of the second portion of the flexible member is substantially thinner in cross-sectional dimension than the rearward segment, so as to impart greater flexibility to that forward segment;

a gripping member fixed to the upper extremity of the windshield, the member having a continuous, outwardly-facing slot extending generally parallel with the upper extremity of the boat windshield and dimensioned to receive the first portion of the flexible member, and the gripping member further including an internal recess dimensioned to receive the second portion of the flexible member; and wherein the boat canopy is attached to the windshield by continuously pushing the second portion of the flexible member through the slot and into the internal recess of the gripping member.

8. The system recited in claim 7 wherein the forward segment extends away from the plane of the first portion at a clockwise angle of between about 60°–80°.

9. The system recited in claim 8 wherein the first surface of the internal recess has an angular relationship different from the angular relationship of the forward segment, so that the forward segment does not lie across the first surface of the internal recess when the flexible member is installed in the gripping member, in order to facilitate removal of the flexible member.

10. A system for rapidly attaching a peripheral edge of a boat canopy continuously to an upper extremity of an associated windshield, comprising:

a flexible member attached continuously to an inside surface of the canopy along the peripheral edge, the flexible member having a first portion extending lateral to the plane of the boat canopy and a second portion attached to the first portion and extending generally lateral to the first portion, wherein the second portion of the flexible member comprises a forward segment extending from the first portion toward the periphery of the canopy and a rearward segment extending from the first portion and away from the periphery of the canopy, and wherein the internal recess is defined by a first surface on one side of the slot for engaging the forward segment and a second surface on the other side of the slot for engaging the rearward segment;

a gripping member fixed to the upper extremity of the windshield, the member having a continuous, outwardly-facing slot extending generally parallel with the upper extremity of the boat windshield and dimensioned to receive the first portion of the flexible member, and the gripping member further including an internal recess dimensioned to receive the second portion of the flexible member wherein the gripping member, including the internal recess and the first and second surfaces thereof, comprise an extruded aluminum member having a curvature conforming to the upper extremity of the boat windshield, the extrusion including two spaced, generally parallel arms dimensioned to engage the boat windshield; the gripping member further comprising an inwardly bevelled surface adjacent the slot for facilitating extension of the forward segment of the flexible member into the internal recess; and wherein the boat canopy is attached to the windshield by continuously pushing the second portion of the flexible member through the slot and into the internal recess of the gripping member.

11. The system recited in claim 10 wherein the upper extremity of the extrusion is defined by a curved plate extending from one side of the slot, over the internal recess and then to one of the two arms.

12. The system recited in claim 11 wherein the internal recess is defined by an internal plate extending first laterally from the second of the two arms and then generally parallel to the second arm, and then intersecting the radial plate.

13. Apparatus for attaching a flexible cover, canopy or article to another member, comprising:
   a gripping member having an elongated internal recess and an elongated slot communicating with the internal recess, the internal recess having a first surface tapering inwardly from the slot;
   a generally flat plate, a riser extending laterally from the plate and first and second locking segments extending generally laterally in opposite directions from the riser, the second locking segment having a taper generally conforming to the taper of the first surface of the internal recess of the gripping member, the plate, the riser and the first and second locking segments comprising an integrally molded flexible member; and wherein
   the plate of the flexible member is sewn to a surface of a cover, canopy or article and then the flexible member is joined to the gripping member by pushing the locking segments into the internal recess, with a tapered second locking segment lying across the tapered surface of the internal recess.

14. The apparatus recited in claim 13 wherein the gripping member, including the internal recess and the first surface, comprise an extruded aluminum member, the extruded aluminum member including a radial plate extending across the internal recess, and two spaced, generally parallel arms extending away from the internal recess.

15. The apparatus recited in claim 13 wherein the second tapered locking segment is substantially thicker in cross-sectional dimension than the first locking segment.

* * * * *